United States Patent [19]

Saitou et al.

[11] Patent Number: 4,991,075
[45] Date of Patent: Feb. 5, 1991

[54] LOW-SWITCHING LOSS DC-DC CONVERTER

[75] Inventors: Akira Saitou; Osamu Takahashi; Seigou Tsukada; Yasuyuki Sohara; Hideki Tsuruse, all of Sagamihara; Hidehiko Sugimoto, Amagasaki, all of Japan

[73] Assignee: Mitsubishi Denki Kabushiki Kaisha, Tokyo, Japan

[21] Appl. No.: 475,979

[22] Filed: Feb. 6, 1990

[30] Foreign Application Priority Data

Feb. 14, 1989 [JP] Japan .................................. 1-34061
Nov. 15, 1989 [JP] Japan ................................. 1-296667

[51] Int. Cl.$^5$ .............................................. H02M 3/24
[52] U.S. Cl. ..................................... 363/15; 363/20; 363/95; 363/97; 363/131
[58] Field of Search ............... 363/15, 20, 21, 95, 363/97, 131

[56] References Cited

U.S. PATENT DOCUMENTS

| | | | |
|---|---|---|---|
| 4,403,269 | 9/1983 | Carroll | 363/131 |
| 4,415,959 | 11/1983 | Vinciarelli | 363/21 |
| 4,674,019 | 6/1987 | Martinelli | 363/20 |
| 4,675,797 | 6/1987 | Vinciarelli | 363/21 |
| 4,709,316 | 11/1987 | Ngo et al. | 363/97 |
| 4,788,634 | 11/1988 | Schlecht et al. | 363/131 |

Primary Examiner—Steven L. Stephan
Assistant Examiner—Jeffrey Sterrett
Attorney, Agent, or Firm—Oblon, Spivak, McClelland, Maier & Neustadt

[57] ABSTRACT

A DC-DC converter comprises a switching element having a rise time $t_{on}$ and a fall time $t_{off}$; a control device for controlling the switching operation of the switching element; a transformer having a primary winding and a secondary winding, the primary winding being connected to a DC power source through the switching element, and having an open inductance $L_M$; an inductance coil having an inductance L connected to the secondary winding of the transformer; and a rectifying device for rectifying the output from the secondary winding of the transformer; assuming that the voltage applied to the primary winding of the transformer is E, the load current flowing through the transformer is $I_D$, and the sum of the stray capacitance of the switching element and the distributed capacity of the windings of the transformer is C1, the following relational expressions being established:

$$L > (E/I_D)T_{on}$$

and $$L_M > t_{off}^2/\pi^2 C1$$

6 Claims, 2 Drawing Sheets

LOW-SWITCHING LOSS DC-DC CONVERTER

BACKGROUND OF THE INVENTION

1. Field of the Invention

The present invention relates to a DC-DC converter.

2. Description of the Related Art

FIG. 4 is a drawing of the circuit of a conventional forward DC-DC converter. In the drawing, reference numeral 2 denotes a transformer having a primary winding 2a, a secondary winding 2b and a reset winding 2c, a DC power source 1 being connected to the primary winding 2a of the transformer 2 through a switching element 3. Reference numeral 4 denotes a reset diode which is connected to the reset winding 2c of the transformer 2 for the purpose of resetting the transformer 2 excited. Reference numerals 6, 7 each denote a rectifying diode connected to the secondary winding 2b; reference numeral 8, a smoothing choke coil; reference numeral 9, a smoothing capacitor; reference numeral 10, a load; and reference numerals 21, 22, 23, a resistance, a diode and a capacitor, respectively, which form a snubber circuit 24.

The operation of the converter will be described below. The switching element 3 is periodically turned on and off by a control circuit (not shown). The energy of the electric power of the DC power source 1 is transmitted forward from the primary winding 2a of the transformer 2 to the secondary winding 2b thereof during the time the switching element 3 is turned on. On the secondary side, the energy is rectified by the rectifying diodes 6, 7, smoothed by the smoothing choke coil 8 and the smoothing capacitor 9 and then supplied to the load 10.

In this sort of converter, the core of the transformer 2, which is excited during the time the switching element 3 is turned on, must be reset at the time the switching element 3 during turned off. In FIG. 4, therefore, the energy is returned to the DC power source 1 through the diode 4 during the time the switching element 3 is turned off.

In addition, an increase in the switching frequency or an increase in the operational speed of the switching element 3 is accompanied by the need for the snubber circuit 24. The snubber circuit 24 is provided for the purpose of securing a safe operating region for the switching element 3 during the switching operation and preventing any loss of the switching element 3.

FIG. 5 is a drawing of waveforms which shows the relation between the drain current $I_D$ and the source/drain voltage $V_{SD}$ of the switching element 3 in the conventional converter in which character E denotes the voltage applied to the transformer 2. As shown in FIG. 5, at the time $T_1$ the switching element 3 is turned on, the leakage inductance of the transformer 2 prevents rapid rising of the drain current ID and causes gradual rising of the drain current $I_D$. At the time $T_2$ the switching element 3 is turned off, the diode 22 and the capacitor 23 prevent rapid rising of the source/drain voltage $V_{SD}$ and causes gradual rising of the source/drain voltage $V_{SD}$.

In this way, the rise time of the drain current $I_D$ and the rise time of the source/drain voltage $V_{SD}$ are set to times longer than the rise time $t_{on}$ of the switching element 3 and the fall time $t_{off}$ thereof, respectively, so that the switching loss can be reduced.

Most of the energy stored in the leakage inductance of the transformer 2 at the time the switching element 3 is turned on is moved to the capacitor 23 when the element 3 is turned off. However, part of the energy is consumed by the resistance 21. Thus, the loss caused by the resistance 21 increases as the switching frequency of the switching element 3 increases, resulting in a reduction in the conversion efficiency. Since the energy stored in the leakage inductance of the transformer 2 is also increased as the load 10 is increased, the rise time of the source/drain voltage $V_{SD}$ is changed by the change in the load 10, and the loss caused by the resistance 21 is also increased.

SUMMARY OF THE INVENTION

The present invention has been achieved with a view to resolving the above-described problem, and it is an object of the present invention to provide a DC—DC converter which enables an increase in the switching frequency and an increase in the operational speed of a switching element.

A DC—DC converter in accordance with the present invention comprises a switching element having a rise time $t_{on}$ and a fall time $t_{off}$, a control means for controlling the switching operation of the switching element, a transformer having a primary winding and a secondary winding, the primary winding being connected to a DC power source through a switching element, and having an open-circuit inductance LM, an inductance means having an inductance L connected to the secondary winding of the transformer in series, and a rectifying means for rectifying the output from the secondary winding of the transformer, wherein, assuming that the voltage applied to the primary winding is E, the load current flowing through the transformer is $I_D$ and the sum of the stray capacitance of the switching element and the distributed capacity of the windings of the transformer is C1, the following relational expressions are established:

$$L > (E/I_D) t_{ton}$$

$$L_M > 4 t_{off}^2 / \pi^2 C1$$

DESCRIPTION OF THE PREFERRED EMBODIMENTS

An embodiment of the present invention will be described below with reference to the attached drawings.

Figure 1:
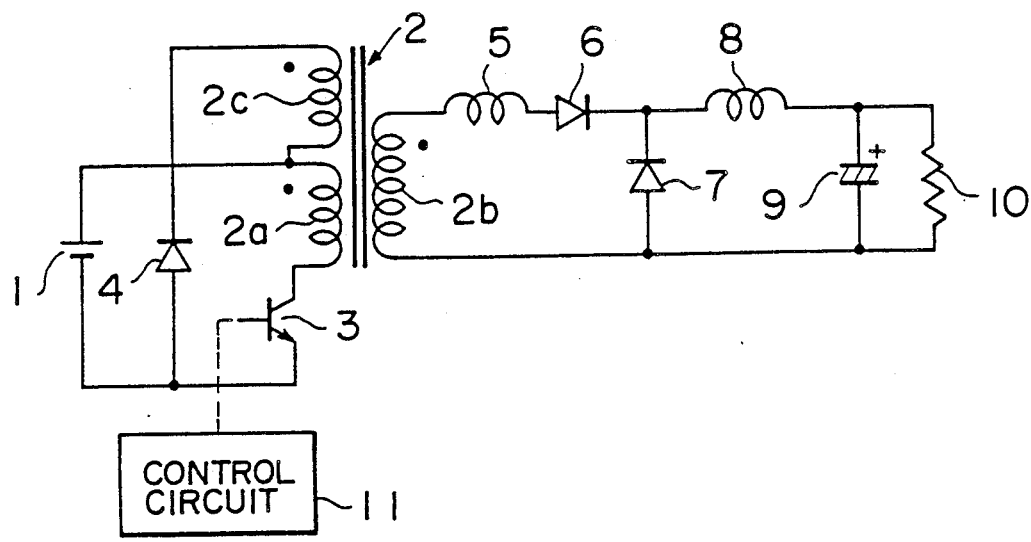
FIG. 1 is a drawing of the circuit of a DC—DC converter in an embodiment of the present invention.

In FIG. 1, a transformer 2 has a primary winding 2a, a secondary winding 2b and a reset winding 2c. A DC power source 1 is connected to the primary winding 2a of the transformer 2 through a switching element 3. A control circuit 11 is connected to the switching element 3 for the purpose of periodic switching operations. A reset diode 4 is connected to the reset winding 2c of the transformer 2. On the other hand, one end of an inductor 5 is connected to the secondary winding 2b of the transformer 2 in series, a rectifying circuit comprising rectifying diodes 6 and 7 being connected to the other end of the inductor 5. A smoothing circuit comprising a smoothing choke coil 8 and a smoothing capacitor 9 is connected to the rectifying circuit, a load 10 being connected to both ends of the capacitor 9.

Figure 2:
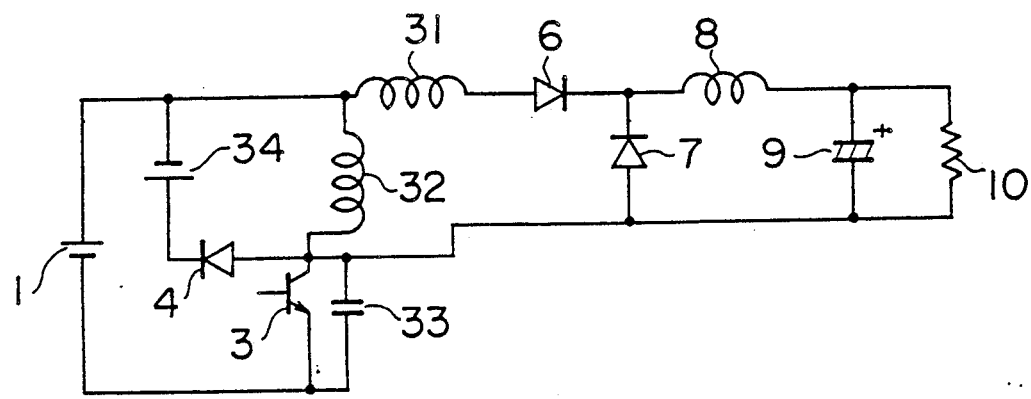
FIG. 2 is a drawing of a circuit equivalent to the embodiment.

FIG. 2 shows a circuit equivalent to this embodiment. In FIG. 2, an inductance 31 includes the inductor 5 and the leakage inductance of the transformer 2, and an inductance 32 shows the open-circuit inductance of the transformer 2. A capacity 33 represents the sum of the stray capacitance of the switching element 3 and the distributed capacity of the windings of the transformer 2. In the drawing, reference numeral 34 denotes a DC power source. In this embodiment, the inductance 31 is formed so as to have a value L which is greater than the value obtained by dividing the product of the voltage E applied to the transformer 2 and the rise time $t_{on}$ of the switching element 3 by the load current $I_D$ flowing through the transformer 2. The inductance 32 has a value $L_M$ which is greater than the value obtained by dividing the product of $4/\pi^2$ and the square of the fall time $t_{off}$ of the switChing element 3 by the value C1 of the capacity 33. Namely, the following relational expressions are obtained:

$$L > E\, t_{on}/I_D \tag{1}$$

$$L_M > 4\, t_{off}^2/\pi^2\, C1 \tag{2}$$

The operation of this embodiment will be described below with reference to the waveforms shown in FIG. 3. The switching element 3 is periodically turned on and off by the control circuit 11, and the drain current (load current) $I_D$ of the switching element 3 when it is switched on is expressed by the following equation:

$$I_D = E\, t_1/L \tag{3}$$

wherein $t_1$ denotes the rise time of the drain current $I_D$. From the equation 3, the following equation for the rise time $t_1$ of the drain current $I_D$ can be obtained:

$$t_1 = I_D\, L/E \tag{4}$$

As the relation 1 is established in this embodiment, the substitution of the relation 1 into the equation 4 gives $$t_1 > t_{on} \tag{5}$$

Figure 3:
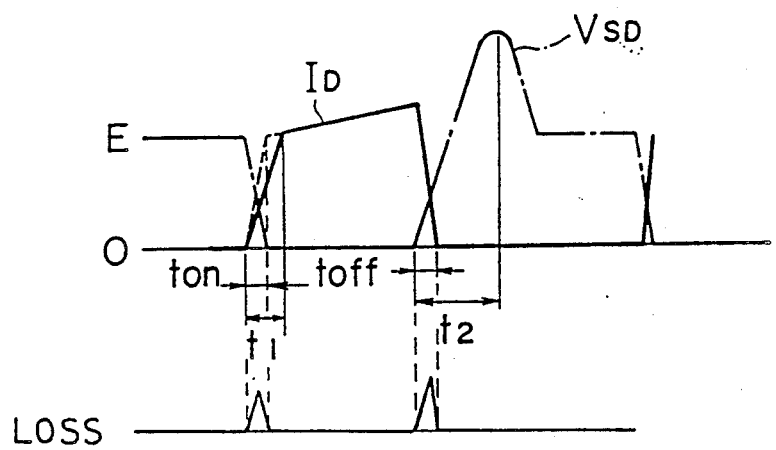
FIG. 3 is a drawing of waveforms which shows the operation of the embodiment.

As shown in FIG. 3, therefore, since the drain current $I_D$ rises after the switching element 3 has sufficiently risen, the loss in the switching element 3 is reduced at this time. In FIG. 3, the broken line shows a case of $t_1 = t_{on}$. As can be seen from the relation 1, when a high-speed switching element 3 is used, the value L of the inductance 31 may be reduced.

Figure 4:
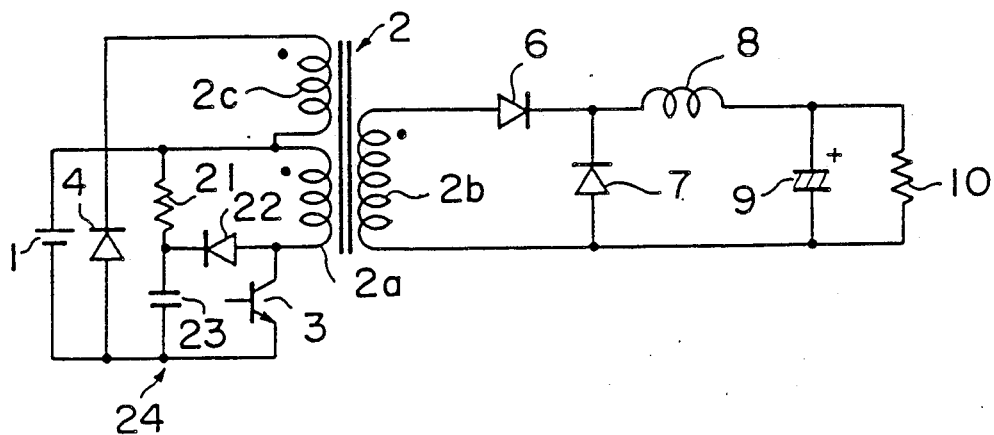
FIG. 4 is a drawing of the circuit of a conventional DC—DC converter.
Figure 5:
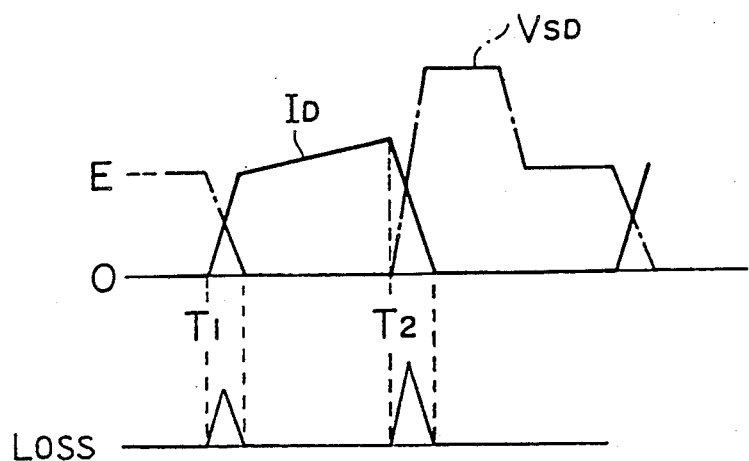
FIG. 5 is a drawing of waveforms which shows the operation of the conventional converter.

During the time the switching element 3 is turned on, the power supplied from the DC power source 1 is transmitted from the primary winding 2a to the secondary winding 2b and supplied to the load 10 in the same way as in the conventional DC—DC converter shown in FIG. 4. Namely, the power of the DC power source 1 is transmitted forward from the primary winding 2a of the transformer 2 to the secondary winding 2b thereof during the time the switching element 3 is turned on. The output from the secondary winding 2b is rectified by the rectifying circuit, smoothed by the smoothing circuit and then supplied to the load 10.

When the switching element 3 is then turned off, a resonant circuit is formed by the open inductance 32 of the transformer 2 and the capacity 33, the rise time $t_2$ of the source/drain voltage $V_{SD}$ of the switching element 3 is expressed by a quater period of the resonant cycle $$2\pi \sqrt{L_M \cdot C1}\, ,$$

i.e., expressed by the following equation:

$$t_2 = \pi \sqrt{L_M \cdot C1}\, /2 \tag{6}$$

However, since the value L of the inductance 31 is set to a small value for the purpose of high-speed switching, it can be assumed that the value L has no influence.

In this embodiment, as the relation 2 is established, the substitution of the equation 6 into the relation 2 gives $$t_2 > t_{off} \tag{7}$$

As shown in FIG. 3, therefore, since the source/drain voltage $V_{SD}$ of the switching element 3 rises after the switching element 3 has sufficiently fallen, the loss in the switching element 3 is reduced at this time.

As described above, this embodiment produces no loss in the resistance of a snubber circuit because the snubber circuit is not used, and enables the realization of an increase in the switching frequency and an increase in the operational speed of the switching element, as well as a reduction in the switching loss.

When the inductance 32 has an extremely high value $L_M$, however, the switching element 3 is turned on during the return of the excited energy of the transformer 2 to the DC power source 1. In consequence, a current of an excessive amount runs through the switching element 3, resulting in a reduction in the conversion efficiency.

Accordingly, it is desired that the value $L_M$ of the inductance 32 is set so as to satisfy the following relation:

$$t_{max} > \pi \sqrt{L_M \cdot C1} \tag{8}$$

wherein $t_{max}$ denotes the maximum time the switching element 3 is turned off. From this relation 8, the following relation for the value $L_M$ can be obtained:

$$L_M < t_{max}^2/\pi^2 \cdot C1 \tag{9}$$

Namely, from the relations 2 and 9, the value $L_M$ of the inductance 32 is desired to be set so that the following relational expression is established:

$$4 \cdot t_{off}^2/\pi^2 \cdot C1 < L_M < t_{max}^2/\pi^2 \cdot C1 \tag{10}$$

The inductance 31 shown in FIG. 2 can be formed only by the leakage inductance of the transformer 2. That is, the inductor 5 shown in FIG. 1 may be removed. In this case, a converter may be designed so that the leakage inductance value $L_1$ of the transformer 2 satisfies the following relation:

$$L_1 > E \cdot t_{on}/I_D \quad (11)$$

However, the leakage inductance value $L_1$ is small and has a negligible effect when the switching element 3 is turned off.

What is claimed is:

1. A DC—DC converter comprising:
   a switching element having a rise time $t_{on}$ and a fall time $t_{off}$;
   a control means for controlling the switching operation of said switching element;
   a transformer having a primary winding and a secondary winding, said primary winding being connected to a DC power source through said switching element, and having an open inductance $L_M$;
   an inductance means having an inductance L connected to said secondary winding of said transformer; and
   a rectifying means for rectifying the output from said secondary winding of said transformer;
   assuming that the voltage applied to said primary winding of said transformer is E, the load current flowing through said transformer is $I_D$, and the sum of the stray capacitance of said switching element and the distributed capacity of said windings of said transformer is C1, the following relational expressions being established:

$$L > (E/I_D) t_{on}$$

and $$L_M > 4 \, t_{off}^2/\pi^2 \, C1.$$

2. A converter according to claim 1, wherein said inductance means includes an inductor connected to said secondary winding of said transformer.

3. A converter according to claim 1, wherein said inductance means comprises the leakage inductance of said transformer.

4. A DC—DC converter comprising:
   a switching element having a rise time $t_{on}$ and a fall time $t_{off}$;
   a control means for controlling the switching operation of said switching element;
   a transformer having a primary winding and a secondary winding, said primary winding being connected to a DC power source through said switching element, and having an open inductance $L_M$;
   an inductance means having an inductance L connected to said secondary winding of said transformer; and
   a rectifying means for rectifying the output from said secondary winding of said transformer;
   assuming that the voltage applied to said primary winding of said transformer is E, the load current flowing through said transformer is $I_D$, the maximum time said switching element is turned off is $t_{max}$, and the sum of the stray capacitance of said switching element and the distributed capacity of said windings of said transformer is C1, the following relational expressions being established:

$$L > (E/I_D) \, t_{on}$$

and $$4 \cdot t_{off}^2/\pi^2 \cdot C1 < L_M 21 \, t_{max}^2/\pi^2 \cdot C1$$

5. A converter according to claim 4, wherein said inductance means includes an inductor connected to said secondary winding of said transformer.

6. A converter according to claim 4, wherein said inductance means comprises the leakage inductance of said transformer.

* * * * *